(12) United States Patent
Chang (10) Patent No.: US 7,787,044 B2
(45) Date of Patent: Aug. 31, 2010

(54) LENS MODULE WITH RAMPED LENS AND CAMERA MODULE WITH SAME

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 403 days.

(21) Appl. No.: 11/957,323

(22) Filed: Dec. 14, 2007

(65) Prior Publication Data

US 2008/0174690 A1 Jul. 24, 2008

(30) Foreign Application Priority Data

Jan. 24, 2007 (CN) .................... 2007 1 0200101

(51) Int. Cl.
*H04N 5/225* (2006.01)
*H04N 5/232* (2006.01)
*G03B 13/00* (2006.01)
*G02B 7/02* (2006.01)

(52) U.S. Cl. .................. 348/357; 348/340; 348/374; 359/823

(58) Field of Classification Search .......... 348/340, 348/357; 359/823, 813, 825, 830
See application file for complete search history.

(56) References Cited

U.S. PATENT DOCUMENTS

| | | | | |
|---|---|---|---|---|
| 5,313,244 A | * | 5/1994 | Arai | 396/132 |
| 6,426,839 B2 | * | 7/2002 | Dou et al. | 359/823 |
| 6,476,985 B2 | * | 11/2002 | Dou et al. | 359/823 |
| 6,967,785 B2 | | 11/2005 | Makii et al. | |
| 7,656,452 B2 | * | 2/2010 | Saito et al. | 348/340 |
| 7,684,689 B2 | * | 3/2010 | Shangguan et al. | 396/144 |
| 2003/0137747 A1 | | 7/2003 | Ting | |
| 2006/0023107 A1 | * | 2/2006 | Bolken et al. | 348/335 |
| 2006/0061891 A1 | * | 3/2006 | Ito et al. | 359/824 |
| 2007/0058964 A1 | * | 3/2007 | Shangguan et al. | 396/144 |
| 2008/0080072 A1 | * | 4/2008 | Chang | 359/823 |
| 2008/0112066 A1 | * | 5/2008 | Harada et al. | 359/819 |

FOREIGN PATENT DOCUMENTS

| | | | |
|---|---|---|---|
| CN | 1790080 A | | 6/2006 |
| JP | 2005274703 A | | 10/2005 |
| KR | 2006122407 A | * | 11/2006 |

\* cited by examiner

*Primary Examiner*—John M Villecco
(74) *Attorney, Agent, or Firm*—Jeffrey T. Knapp (57) ABSTRACT

A lens module includes a lens barrel, a first lens, an adjusting disk and at least one first elastic member. The first lens has at least three first sloping portions thereon each having a lower end and a higher end gradually sloping from the lower end. The first sloping portions arranged end to end with the higher end of each first sloping portion being adjacent to the lower end of the corresponding adjacent first sloping portion, with the first sloping portions arranged on a common circular path. The adjusting disk has a first surface and an opposite second surface. The adjusting disk is rotatably mounted on the lens barrel. The adjusting disk has at least three first protrusions on the first surface thereof. The first protrusions respectively abut the first sloping portions of the first lens. The first elastic member biases the first lens toward the adjusting disk.

15 Claims, 7 Drawing Sheets

LENS MODULE WITH RAMPED LENS AND CAMERA MODULE WITH SAME

BACKGROUND

1. Technical Field

The present invention relates to lens modules, and particularly to a lens module having a focusing function, a lens of the lens module, and a camera module using the lens module.

2. Description of Related Art

Currently, camera modules are in widespread use in a variety of portable electronic devices, such as mobile phones, notebook computers, and personal digital assistants (PDAs). Such camera modules are typically required to have excellent imaging performance, and accurate and convenient focusing functions.

A conventional camera module includes a lens module and an image sensor. The lens module includes at least one lens. The image sensor is positioned in alignment with the at least one lens. The focusing function is usually carried out by a mechanism wherein a distance between the at least one lens and the image sensor is varied. Generally, an actuator such as a step motor is provided to drive the least one lens to achieve the focusing function. However, the step motor is typically quite bulky. In addition, the step motor consumes a substantial amount of power, especially relative to the amount of power that can be stored in a typical battery system that powers the camera module.

What is needed, therefore, is a lens module having a simple and energy-efficient focusing mechanism, a lens of the lens module, and a camera module using the lens module.

SUMMARY

In one embodiment, an exemplary lens module includes a lens barrel, a first lens, an adjusting disk and at least one first elastic member. The first lens has at least three first sloping portions provided thereon. Each of the first sloping portions has a lower end and a higher end, with the first sloping portion gradually sloping from the lower end to the higher end. The first sloping portions are arranged end to end with the higher end of each first sloping portion being adjacent to the lower end of the corresponding adjacent first sloping portion, with the first sloping portions arranged on a common circular path. The adjusting disk has a first surface and a second surface at opposite sides thereof. The adjusting disk are rotatably mounted on the lens barrel. The adjusting disk has at least three first protrusions provided on the first surface thereof. The first protrusions respectively abut the first sloping portions of the first lens. The at least one first elastic member biases the first lens toward the adjusting disk. Wherein when the adjusting disk is rotated relative to the lens barrel between a first position where the first protrusions abut against the lower ends of the first sloping portions and a second position where the first protrusions abut against the higher ends of the first sloping portions, the first lens moves along an axis of the lens barrel.

In another embodiment, an exemplary lens is provided. The lens has a central optical portion and a peripheral portion surrounding the central optical portion. The peripheral portion has at least three first sloping portions provided thereon. Each of the first sloping portions has a lower end and a higher end, with the first sloping portion gradually sloping from the lower end to the higher end. The first sloping portions are arranged end to end with the higher end of each first sloping portion being adjacent to the lower end of the corresponding adjacent first sloping portion, with the first sloping portions arranged on a common circular path.

In a further embodiment, an exemplary camera module is provided. The camera module includes a lens module such as that described above, and an image sensor aligned with the lens module.

Other novel features and advantages will become more apparent from the following detailed description of preferred and exemplary embodiments when taken in conjunction with the accompanying drawings.

BRIEF DESCRIPTION OF THE DRAWINGS

Many aspects of the present lens module, lens, and camera module can be better understood with reference to the following drawings. The components in the drawings are not necessarily drawn to scale, the emphasis instead being placed upon clearly illustrating the principles of the present lens module, lens, and camera module. Moreover, in the drawings, like reference numerals designate corresponding parts throughout the several views.

DETAILED DESCRIPTION OF THE PREFERRED EMBODIMENTS

Embodiments of the present lens module, lens, and camera module will now be described in detail below and with reference to the drawings.

Figure 1:
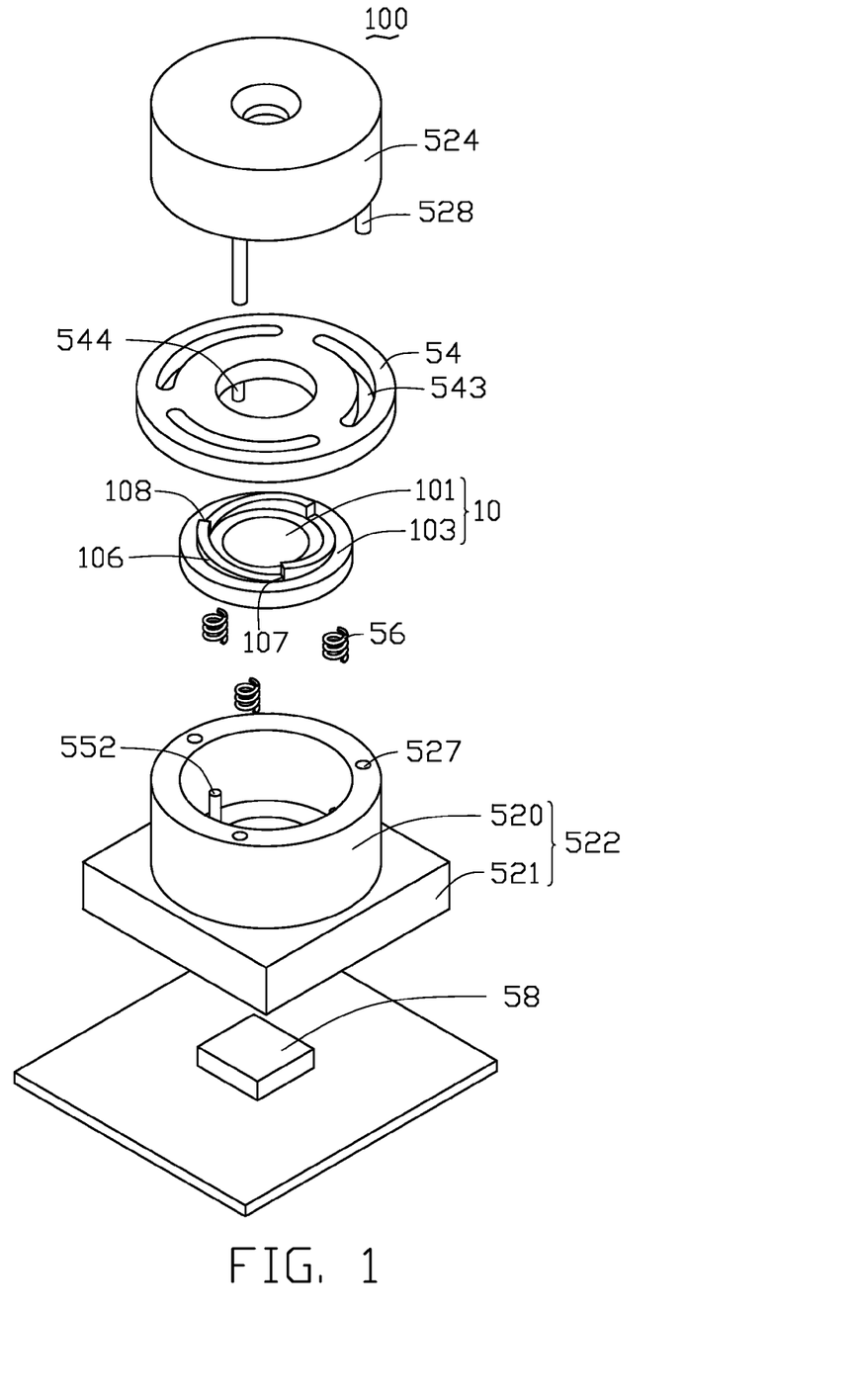
FIG. 1 is an exploded, isometric view of a camera module according to a first embodiment of the present invention.
Figure 2:
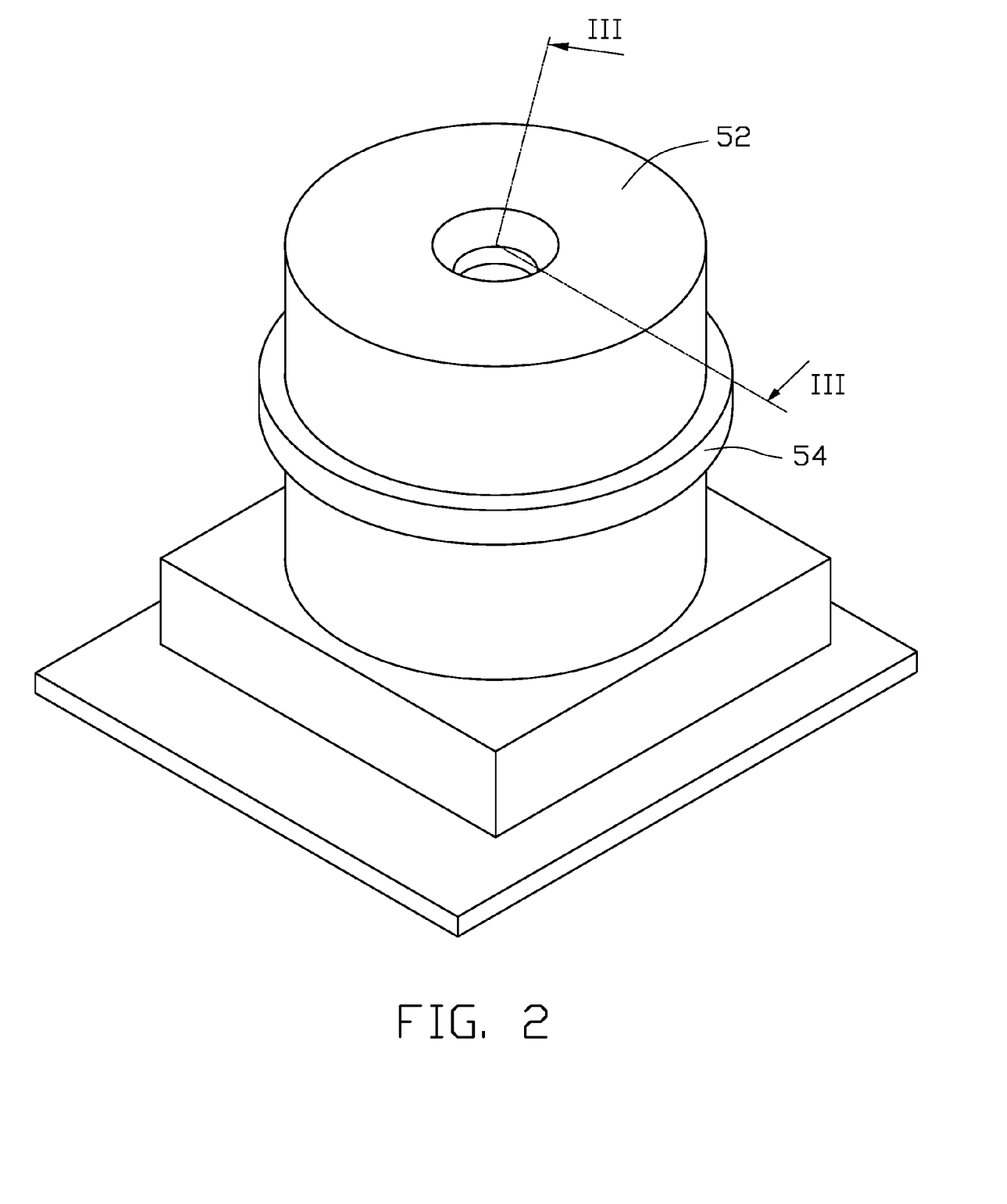
FIG. 2 is an enlarged, assembled view of the camera module of FIG. 1.
Figure 3:
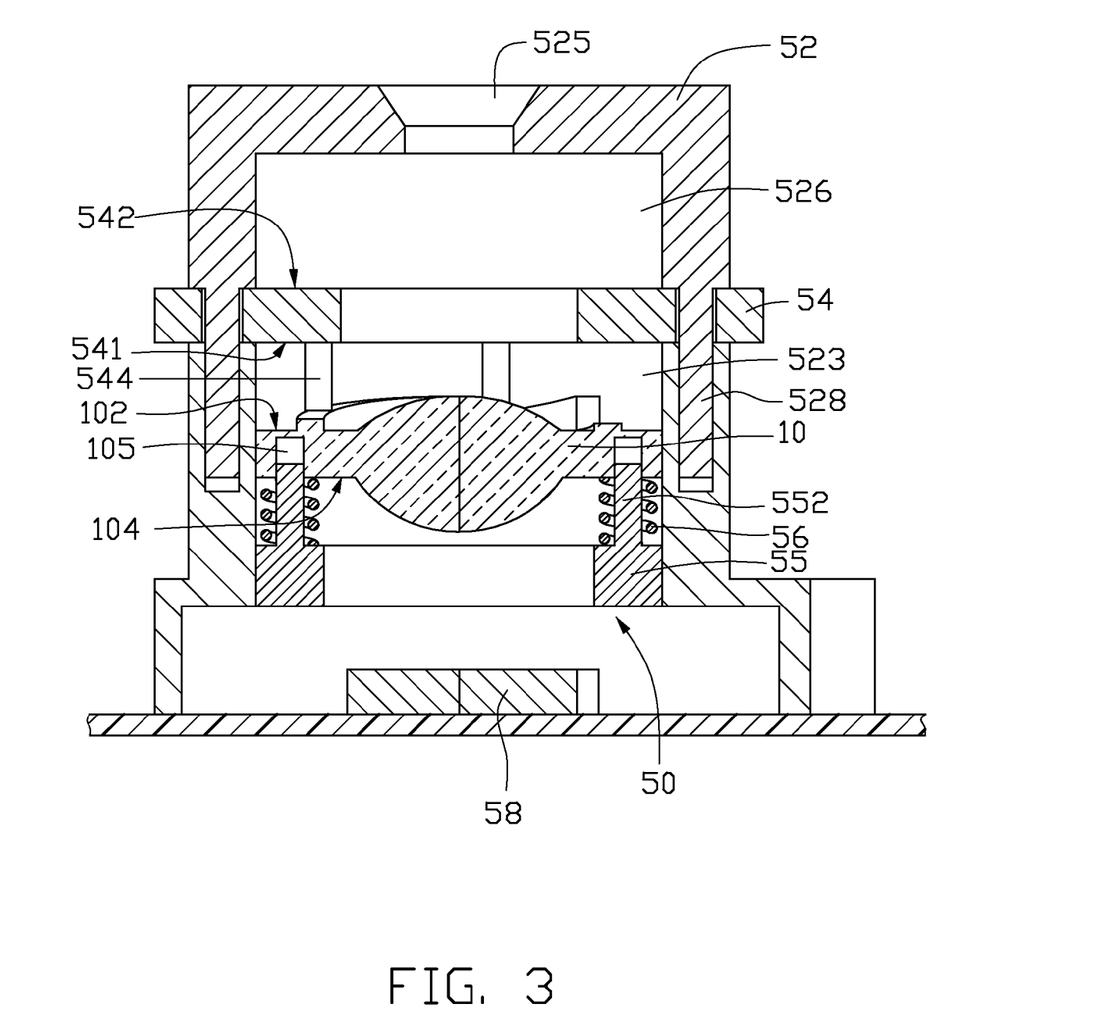
FIG. 3 is a cross-sectional view taken along line III-III of the camera module shown in FIG. 2.

Referring to FIGS. 1 to 3, an exemplary camera module 100 according to a first embodiment includes a lens module 50 and an image sensor 58. The lens module 50 includes a first lens 10, a lens barrel 52, an adjusting disk 54, a retaining member 55, and three first elastic members 56.

The first lens 10 is typically made of plastic or glass. The first lens 10 has a central optical portion 101, and a peripheral portion 103 surrounding the central optical portion 101. The optical characteristics of the central optical portion 101 can be configured according to need. For example, either or both of main surfaces of the central optical portion 101 can be spherical and/or aspherical. The peripheral portion 103 has a first surface 102 and a second surface 104 at opposite sides thereof. The first surface 102 has three first sloping portions 106 provided thereon, and the second surface 104 has three evenly spaced guide holes 105 defined thereat. Each of the three first sloping portions 106 has a lower end 107 and a higher end 108. The first sloping portion 106 gradually slopes upwards from the lower end 107 to the higher end 108. The three first sloping portions 106 are arranged to be adjacent to one another in an end to end fashion, with the higher end 108 of each first sloping portion 106 being connected with the lower end 107 of the adjacent first sloping portion 106. The three first sloping portions 106 thus cooperatively form a complete ring.

The lens barrel 52 includes a main body 522 and a cover body 524. The main body 522 includes a hollow cylinder portion 520, and a hollow frame portion 521 communicating with the cylinder portion 520. The image sensor 58 is received in the frame portion 521. The main body 522 has an inner space 523. The cover body 524 has a light incident opening 525, and an inner space 526 communicating with the inner space 523 of the main body 522. The main body 522 has three evenly spaced positioning holes 527 defined therein. The cover body 524 has three evenly spaced positioning posts 528 provided on a bottom side thereof, corresponding to the positioning holes 527.

The adjusting disk 54 has a first surface 541 and a second surface 542 at opposite sides thereof. Three evenly spaced curved grooves 543 with a same constant curvature are defined in the adjusting disk 54. The curved grooves 543 are through grooves, each of which spans between the first surface 541 and the second surface 542. Three evenly spaced first protrusions 544 are provided on the first surface 541. The adjusting disk 54 is positioned between the main body 522 and the cover body 524 of the lens barrel 52. The three positioning posts 528 of the cover body 524 engage in the respective three positioning holes 527 of the main body 522 through the respective three curved grooves 543 of the adjusting disk 54, such that the adjusting disk 54 is rotatable relative to the main body 522 and the cover body 524. Further, the three first protrusions 544 abut against the respective three first sloping portions 106 of the first lens 10.

The retaining member 55 is ring shaped, and is attached in the main body 522. The retaining member 55 has three guide posts 552 provided thereon, which are slidably engaged in the respective three guide holes 105 of the first lens 10. In the illustrated embodiment, the three first elastic members 56 are coil springs. The three first elastic members 56 are engaged around the respective three guide posts 552. Bottom ends of the first elastic members 56 abut a main body of the retaining member 55, and top ends of the first elastic members 56 abut the second surface 104 of the first lens 10. The three first elastic members 56 each are configured for applying force on the first lens 10 to push the first lens 10 toward the adjusting disk 54 along an optical axis of the first lens 10.

When the adjusting disk 54 is driven manually or by an appropriate motorized mechanism to rotate relative to the main body 522 and the cover body 524 of the lens barrel 52 between a first position where the three first protrusions 544 abut against the lower ends 107 of the three first sloping portions 106 and a second position where the three first protrusions 544 abut against the higher ends 108 of the three first sloping portions 106, the first lens 10 moves relative to the adjusting disk 54 and the image sensor 58 in the lens barrel 52 along the optical axis of the first lens 10 under the force of the three first elastic members 56. A focusing function of the camera module 100 is thus realized.

Alternatively, the adjusting disk 54 can be mounted rotatably on the main body 522 by other mechanisms, such as a flange. In such case, the cover body 524, the curved grooves 543 of the adjusting disk 54, and the positioning holes 527 in the main body 522 can be omitted.

Figure 4:
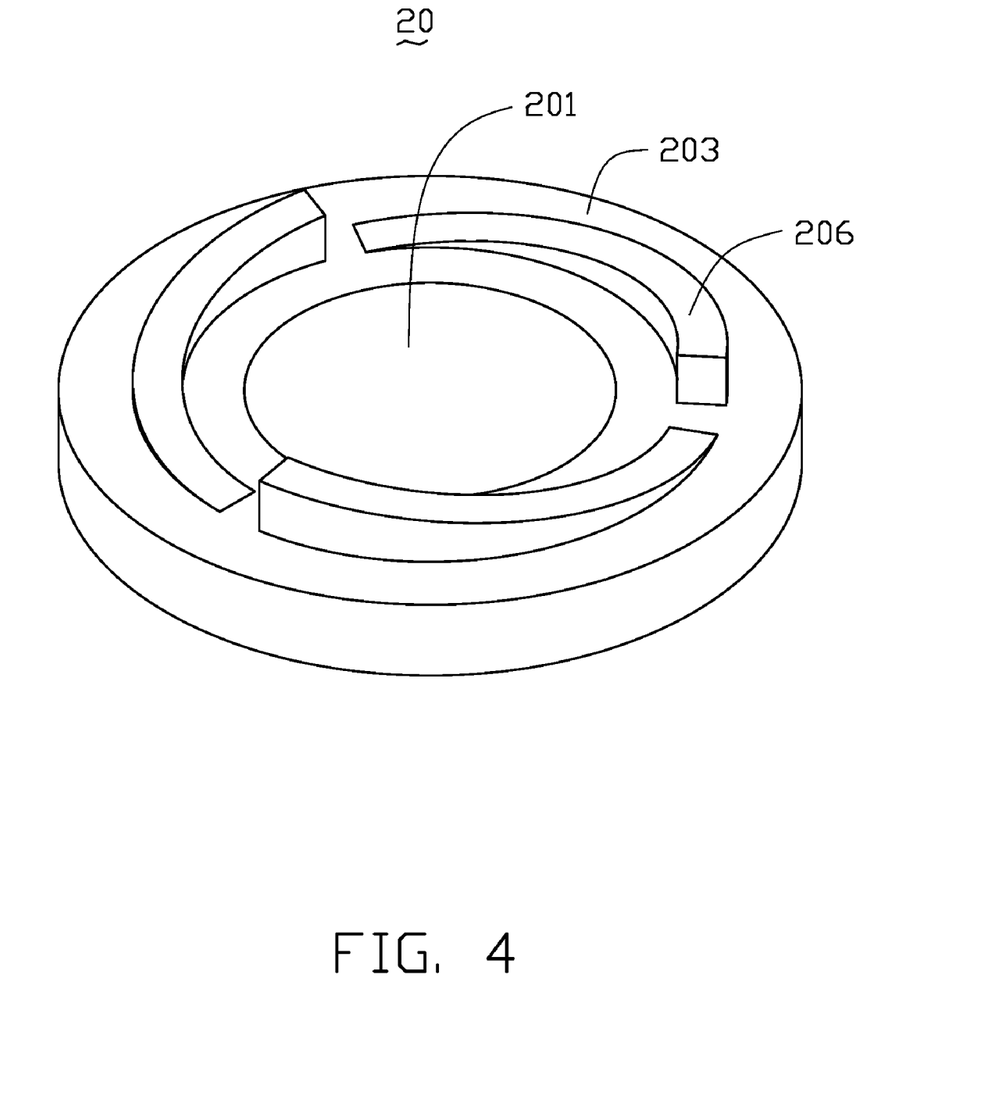
FIG. 4 is an isometric view of a lens according to a second embodiment of the present invention.

FIG. 4 shows a second lens 20 according to a second embodiment. The second lens 20 is similar to the first lens 10 described above. However, the second lens 20 has a central optical portion 201, and a peripheral portion 203 surrounding the central optical portion 201. Three equidistantly spaced sloping portions 206 are provided on the peripheral portion 203 of the second lens 20.

Figure 5:
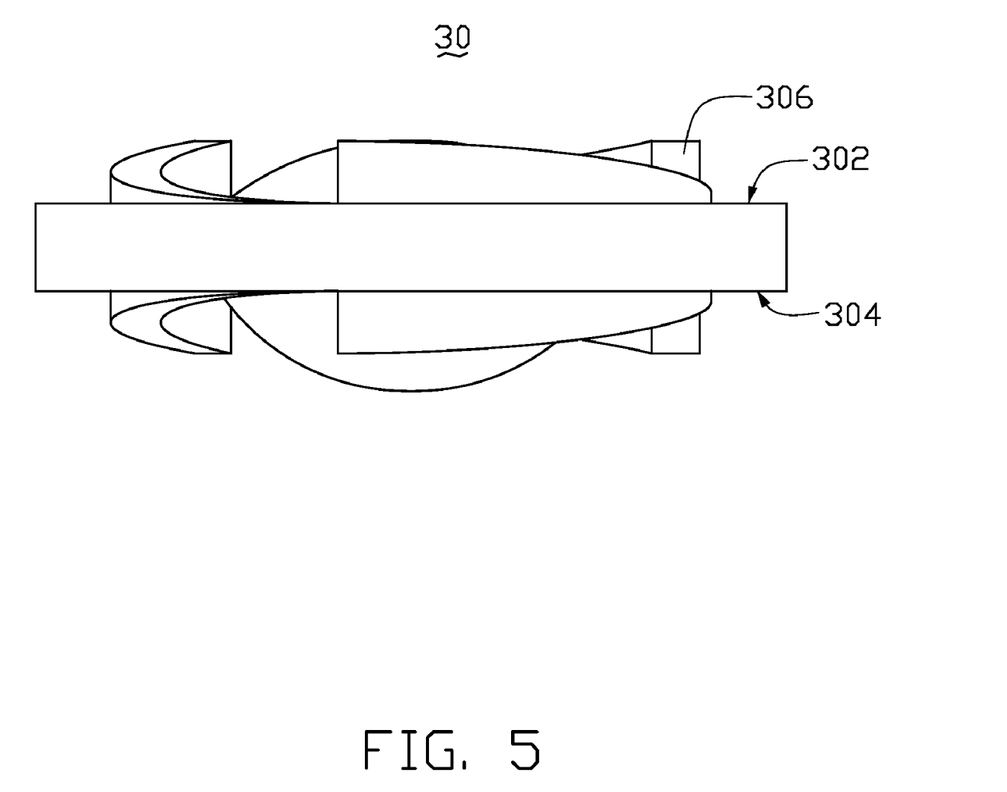
FIG. 5 is an elevational view of a lens according to a third embodiment of the present invention.

Referring to FIG. 5, an elevational view of a third lens 30 according to a third embodiment is shown. The third lens 30 is similar to the first lens 10 described above. However, a peripheral portion of the third lens 30 has a first surface 302 and a second surface 304 at opposite sides thereof. Each of the first surface 302 and the second surface 304 has three sloping portions 306 provided thereon. The three sloping portions 306 of the first surface 302 are oriented symmetrically relative to the three sloping portions 306 of the second surface 304.

Figure 6:
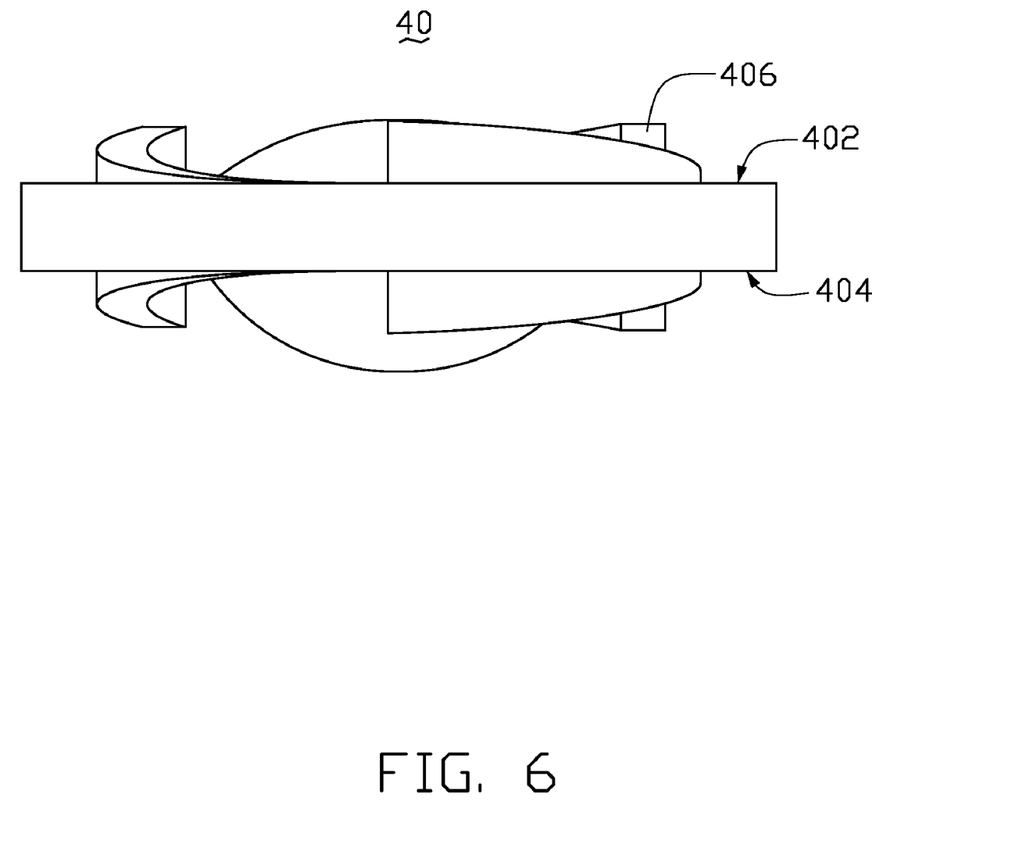
FIG. 6 is an elevational view of a lens according to a fourth embodiment of the present invention.

Referring to FIG. 6, an elevational view of a fourth lens 40 according to a fourth embodiment is shown. The fourth lens 40 is similar to the second lens 20 described above. However, a peripheral portion of the fourth lens 40 has a first surface 402 and a second surface 404 at opposite sides thereof. Each of the first surface 402 and the second surface 404 has three sloping portions 406 provided thereon. The three sloping portions 406 of the first surface 402 are oriented symmetrically relative to the three sloping portions 406 of the second surface 404.

Figure 7:
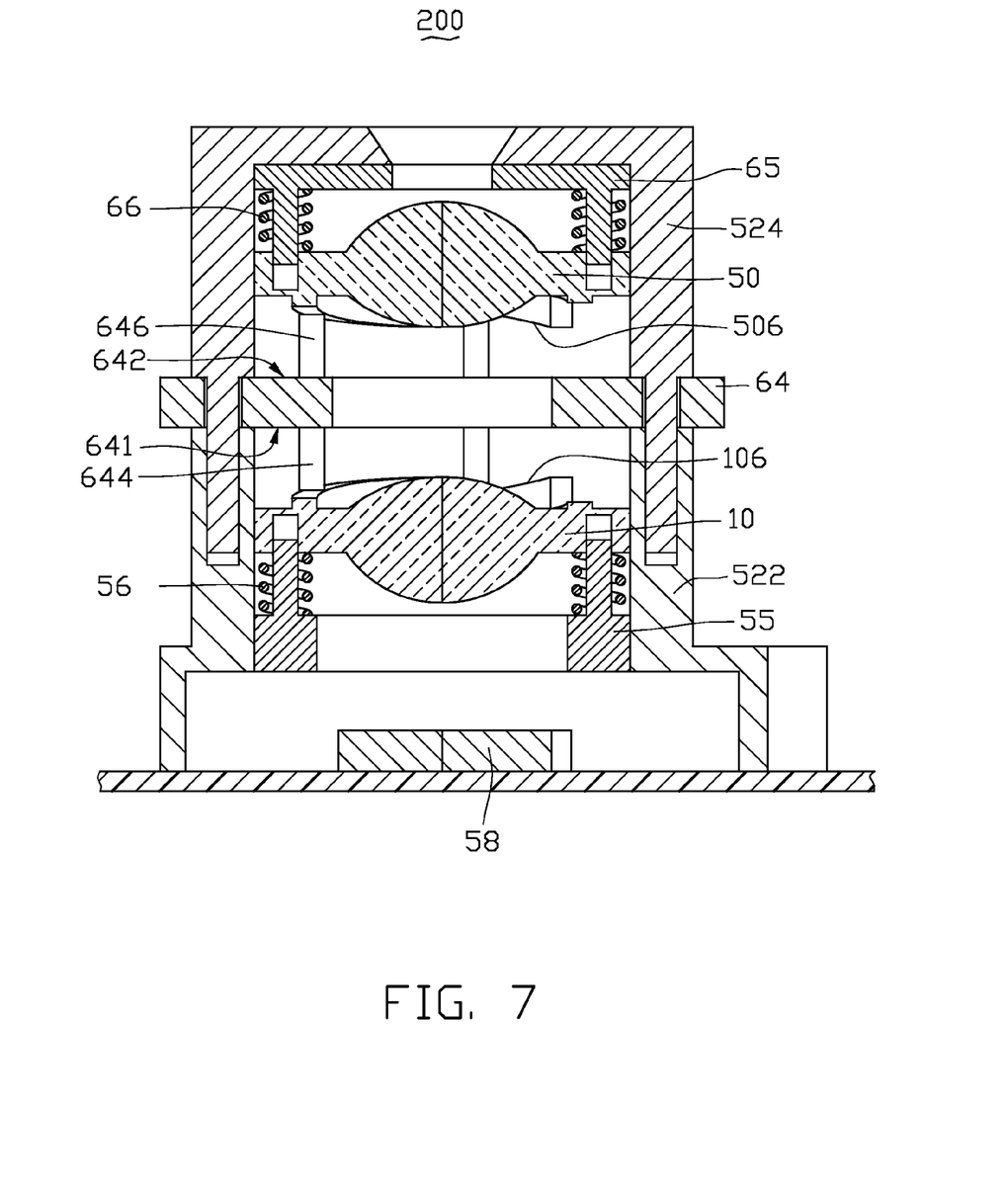
FIG. 7 is a cross-sectional view of a camera module according to a fifth embodiment of the present invention.

FIG. 7 shows a camera module 200 according to a fifth embodiment. The camera module 200 is similar to the camera module 100 described above. However, in the camera module 200, a rotatable adjusting disk 64 has a first surface 641 and a second surface 642 at opposite sides thereof. Three evenly spaced first protrusions 644 extend down from the first surface 641, and three evenly spaced second protrusions 646 extend up from the second surface 642. Furthermore, a fifth lens 50, a second retaining member 65, and three second elastic members 66 are included in the cover body 524. The fifth lens 50 can be the same as the first lens 10 or the second lens 20 illustrated above. The fifth lens 50 has three second sloping portions 506 provided thereon. The three first protrusions 644 abut against the respective three first sloping portions 106 of the first lens 10. The three second protrusions 646 abut against the respective three second sloping portions 506 of the fifth lens 50.

When the adjusting disk 64 is driven manually or by an appropriate motorized mechanism to rotate relative to the main body 522 and the cover body 524, the first lens 10 and fifth lens 50 are movable relative to the adjusting disk 64 in the respective main body 522 and cover body 524 of the lens barrel 52. The camera module 200 thus has a focusing function and a zooming function.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A lens module, comprising:
   a lens barrel;
   a first lens received in the lens barrel, the first lens comprising at least three first sloping portions provided thereon, each of the first sloping portions having a lower end and a higher end, with the first sloping portion gradually sloping from the lower end to the higher end, the first sloping portions arranged end to end with the higher end of each first sloping portion being adjacent to the lower end of the corresponding adjacent first sloping portion, with the first sloping portions arranged on a common circular path;
   an adjusting disk having a first surface at one side thereof, the adjusting disk being rotatably mounted on the lens barrel, the adjusting disk comprising at least three first protrusions provided on the first surface thereof, the first protrusions respectively abutting the first sloping portions of the first lens; and at least one first elastic member biasing the first lens toward the adjusting disk,
wherein when the adjusting disk is rotated relative to the lens barrel between a first position where the first protrusions abut against the lower ends of the first sloping portions and a second position where the first protrusions abut against the higher ends of the first sloping portions, the first lens moves along an axis of the lens barrel.

2. The lens module as described in claim 1, wherein the first sloping portions are connected to one another.

3. The lens module as described in claim 1, wherein the first sloping portions are evenly spaced apart from one another.

4. The lens module as described in claim 1, wherein the first sloping portions have a same curvature along the common circular path.

5. The lens module as described in claim 1, further comprising a ring-shaped retaining member provided in the lens barrel, wherein the at least one first elastic member comprises three elastic members, first ends of the elastic members abut the retaining member, and opposite second ends of the elastic members abut the first lens.

6. The lens module as described in claim 1, wherein the adjusting disk has at least three curved grooves defined therethrough, the lens barrel has a main body and a cover body, each of the main body and the cover body has an inner space, with the inner spaces communicating with each other, the first lens is received in the inner space of the main body, the main body has at least three positioning holes respectively aligned with the curved grooves of the adjusting disk, the cover body has at least three positioning posts provided thereon, and the positioning posts of the cover body respectively extend through the curved grooves of the adjusting disk and are respectively engaged in the positioning holes of the main body, such that the adjusting disk is rotatable relative to the main body and the cover body of the lens barrel.

7. The lens module as described in claim 6, wherein the curved grooves have a same curvature.

8. The lens module as described in claim 6, further comprising a second lens and at least one second elastic member, the second lens being received in the inner space of the cover body, the second lens comprising at least three second sloping portions provided thereon, each of the second sloping portions having a lower end and a higher end, with the second sloping portion gradually sloping from the lower end to the higher end, the second sloping portions arranged end to end with the higher end of each second sloping portion being adjacent to the lower end of the corresponding adjacent second sloping portion, with the second sloping portions arranged on a common circular path, the adjusting disk also having a second surface, the first and second surfaces being at opposite sides of the adjusting disk, the adjusting disk further comprising at least three second protrusions provided on the second surface thereof, the second protrusions respectively abutting the second sloping portions of the second lens, and the at least one second elastic member biasing the second lens toward the adjusting disk, wherein when the adjusting disk is rotated relative to the main body and the cover body of the lens barrel, the first lens and second lens move in the respective main body and cover body of the lens barrel along the axis of the lens barrel.

9. The lens module as described in claim 8, wherein the second sloping portions are connected to one another.

10. The lens module as described in claim 8, wherein the second sloping portions are evenly spaced apart from one another.

11. A lens, comprising:
a central optical portion; and
a peripheral portion surrounding the central optical portion, the peripheral portion comprising at least three first sloping portions provided thereon, each of the first sloping portions having a lower end and a higher end, with the first sloping portion gradually sloping from the lower end to the higher end, the first sloping portions arranged end to end with the higher end of each first sloping portion being adjacent to the lower end of the corresponding adjacent first sloping portion, with the first sloping portions arranged on a common circular path, wherein the peripheral portion has a first surface and a second surface at opposite sides thereof, the first sloping portions are provided on the first surface, and the peripheral portion further comprises at least three second sloping portions on the second surface, the second sloping portions configured substantially the same as the first sloping portions but being oriented symmetrically relative to the first sloping portions respectively.

12. The lens as described in claim 11, wherein the first sloping portions are connected to one another, and the second sloping portions are connected to one another.

13. The lens as described in claim 11, wherein the first sloping portions are evenly spaced apart from one another, and the second sloping portions are evenly spaced apart from one another.

14. The lens as described in claim 13, wherein a first gap is maintained between every two neighboring first sloping portions, and a second gap is maintained between every two neighboring second sloping portions.

15. A camera module, comprising:
a lens barrel;
a first lens received in the lens barrel, the first lens comprising at least three first sloping portions provided thereon, each of the first sloping portions having a lower end and a higher end, with the first sloping portion gradually sloping from the lower end to the higher end, the first sloping portions arranged end to end with the higher end of each first sloping portion being adjacent to the lower end of the corresponding adjacent first sloping portion, with the first sloping portions arranged on a common circular path;
an adjusting disk having a first surface and a second surface at opposite sides thereof, the adjusting disk being rotatably mounted on the lens barrel, the adjusting disk comprising at least three first protrusions provided on the first surface thereof, the first protrusions respectively abutting the first sloping portions of the first lens;
at least one first elastic member biasing the first lens toward the adjusting disk; and
an image sensor aligned with the first lens,
wherein when the adjusting disk is rotated relative to the lens barrel between a first position where the first protrusions abut against the lower ends of the first sloping portions and a second position where the first protrusions abut against the higher ends of the first sloping portions, the first lens moves along an axis of the lens barrel.

* * * * *